(12) United States Patent
Aggarwal et al.

(10) Patent No.: US 11,238,854 B2
(45) Date of Patent: Feb. 1, 2022

(54) FACILITATING CREATION AND PLAYBACK OF USER-RECORDED AUDIO

(71) Applicant: Google LLC, Mountain View, CA (US)

(72) Inventors: Vikram Aggarwal, Palo Alto, CA (US); Barnaby James, Los Gatos, CA (US)

(73) Assignee: Google LLC, Mountain View, CA (US)

( * ) Notice: Subject to any disclaimer, the term of this patent is extended or adjusted under 35 U.S.C. 154(b) by 451 days.

(21) Appl. No.: 15/378,920

(22) Filed: Dec. 14, 2016

(65) Prior Publication Data

US 2018/0166074 A1 Jun. 14, 2018

(51) Int. Cl.
*G10L 15/02* (2006.01)
*G10L 15/08* (2006.01)
(Continued)

(52) U.S. Cl.
CPC .............. *G10L 15/22* (2013.01); *G10L 15/02* (2013.01); *G10L 15/08* (2013.01); *G10L 21/007* (2013.01);
(Continued)

(58) Field of Classification Search
None
See application file for complete search history.

(56) References Cited

U.S. PATENT DOCUMENTS

| 6,205,204 | B1 | 3/2001 | Morganstein et al. |
| 2008/0140413 | A1* | 6/2008 | Millman .................. G09B 7/02 704/270 |

(Continued)

FOREIGN PATENT DOCUMENTS

| CN | 102355646 | 2/2012 |
| CN | 103390016 | 11/2013 |

(Continued)

OTHER PUBLICATIONS

European Patent Office—International Searching Authority; Notification of Transmittal of the International Search Report and the Written Opinion of PCT Serial No. PCT/US2017/054452; dated Jan. 3, 2018.

(Continued)

*Primary Examiner* — Richa Mishra
(74) *Attorney, Agent, or Firm* — Middleton Reutlinger

(57) ABSTRACT

Methods, apparatus, and computer readable media are described related to recording, organizing, and making audio files available for consumption by voice-activated products. In various implementations, in response to receiving an input from a first user indicating that the first user intends to record audio content, audio content may be captured and stored. Input may be received from the first user indicating at least one identifier for the audio content. The stored audio content may be associated with the at least one identifier. A voice input may be received from a subsequent user. In response to determining that the voice input has particular characteristics, speech recognition may be biased in respect of the voice input towards recognition of the at least one identifier. In response to recognizing, based on the biased speech recognition, presence of the at least one identifier in the voice input, the stored audio content may be played.

15 Claims, 8 Drawing Sheets

(51) Int. Cl.
*G10L 21/007* (2013.01)
*G10L 25/51* (2013.01)
*G10L 15/22* (2006.01)

(52) U.S. Cl.
CPC ........ *G10L 25/51* (2013.01); *G10L 2015/088* (2013.01); *G10L 2015/223* (2013.01)

(56) References Cited

U.S. PATENT DOCUMENTS

| | | |
|---|---|---|
| 2008/0221880 A1 | 9/2008 | Cerra et al. |
| 2011/0165549 A1 | 7/2011 | Hao |
| 2012/0265528 A1 | 10/2012 | Gruber et al. |
| 2013/0178961 A1 | 7/2013 | Ly et al. |
| 2014/0109046 A1* | 4/2014 | Hirsch ............... G06F 9/44 717/120 |
| 2014/0249817 A1* | 9/2014 | Hart ............... G10L 15/22 704/239 |
| 2015/0067320 A1* | 3/2015 | Chatterton ........... G06F 21/31 713/100 |
| 2017/0242657 A1* | 8/2017 | Jarvis ............... G06F 3/167 |

FOREIGN PATENT DOCUMENTS

| | | | |
|---|---|---|---|
| CN | 104620314 | | 5/2015 |
| JP | 2007152787 | | 6/1995 |
| JP | 2010085522 | | 4/2010 |
| JP | 2011203859 | | 10/2011 |
| JP | 2016535893 | | 11/2016 |
| KR | 20170056364 A | * | 5/2017 |
| WO | 2010008509 | | 1/2010 |

OTHER PUBLICATIONS

European Patent Office; Written Opinion of the International Preliminary Examining Authority of International Application No. PCT/US2017/054452; dated Jul. 2, 2018.
United Kingdom Intellectual Property Office; Combined Search and Examination Report issued in Application No. 1715653.0 dated Mar. 26, 2018.
European Patent Office; International Preliminary Report on Patentability of PCT Ser. No. PCT/US2017/054452; 16 pages; dated Feb. 11, 2019.
European Patent Office; Intention to Grant issued in Application No. 17781366.4 dated Jul. 31, 2019.
China National Intellectual Property Administration; Notice of Allowance issued in Application No. 201710918670.5; 4 pages; dated Jun. 22, 2021.
Japanese Patent Office; Notice of Allowance issued in Applicatiion No. 2019-531697; 3 pages; dated Apr. 13, 2020.
Korean Patent Office; Notice of Allowance issued in Application No. 10-2019-7017813; 3 pages; dated Jan. 10, 2020.
Korean Patent Office; Office Action issued in Application No. 10-2019-7017813; 7 pages; dated Oct. 17, 2019.
Japanese Patent Office; Office Action issued in Applicatiion No. 2019-531697; 6 pages; dated Nov. 18, 2019.
Intellectual Property India; Office Action issued in Application No. 201927022326; 6 pages; dated Mar. 19, 2021.
China National Intellectual Property Administration; Office Action issued in Application No. 201710918670.5; 27 pages; dated Jul. 8, 2020.
China National Intellectual Property Administration; Office Action issued in Application No. 201710918670.5; 3 pages; dated Mar. 10, 2021.
Great Britain Intellectual Property; Examination Report issued in Application No. 1715653.0; 2 pages; dated Sep. 13, 2019.
Deutsches Patent Office; Examination Report issued in Application No. 10 2017 122 513.7; 8 pages; dated Apr. 7, 2021.

* cited by examiner

FACILITATING CREATION AND PLAYBACK OF USER-RECORDED AUDIO

BACKGROUND

Automated assistants (also known as "personal assistant modules", "mobile assistants", or "chat bots") may be interacted with by a user via a variety of computing devices, such as smart phones, tablet computers, wearable devices, automobile systems, standalone personal assistant devices, and so forth. The automated assistants receive input from the user (e.g., typed and/or spoken natural language input) and respond with responsive content (e.g., visual and/or audible natural language output).

Voice-activated (or "voice-enabled") products such as smart phones, vehicle computing systems, wearable devices, and standalone voice-activated speakers are becoming more ubiquitous. However, availability of audible content on these devices, such as audio books, may be limited, and/or may require users to purchase access to such content. Moreover, such audio content may be recorded by individuals with no personal ties to the consuming user. Many users already have access to narrative content such as books, scripts, screenplays, etc., e.g., in written form (e.g., children's books, etc.), as well as memorized narratives such as stories, songs, speeches, etc. In the case of written content for children, such as children's books, parents or guardians may not always be physically present and/or available to read the content aloud. In the case of scripts and/or screenplays involving multiple characters engaging in spoken dialog, it may not always be possible to have sufficient users present to fully reenact/practice a scene.

SUMMARY

Techniques are described herein for recording, organizing, and making audio files available for consumption by voice-activated products.

In various implementations, a voice activated product may respond to receiving an input from a first user indicating that the first user intends to record audio content by causing capture and storage of audio content provided by the first user. The audio content may include, for instance, a narrative, such as a children's story. The first user may provide, in addition to the audio content, an input indicating at least one identifier for the audio content. In response to provision of the at least one identifier, the stored audio content may be associated with the at least one identifier. At a subsequent time, the voice-activated product may receive a voice input from a subsequent user, and characteristics of the voice input may be analyzed. In response to determining that the voice input has particular characteristics, speech recognition performed in respect of the voice input may be biased towards recognition of the at least one identifier. Finally, in response to recognizing, based on the biased speech recognition, the presence of at least one identifier in the voice input, playback of the stored audio content may be initiated.

As will be appreciated, the voice activated product may thus facilitate more effective retrieval of the stored audio content, particularly in situations in which the subsequent user may ordinarily have difficulty interacting with the voice activated product. This may occur, for instance, when the subsequent user's speech is less clear than that of the average user of such devices, (e.g. when the subsequent user is a young child or has a disability which affects the clarity of their speech). In some instances, the identifier may be, for instance, an alias or nickname for the audio content, which is familiar to the subsequent user, and so may further facilitate retrieval of the audio content. Furthermore, in some implementations, in response to the biased speech recognition yielding a non-recognition of the voice input, a selectable option may be provided to the user, selection of which causes playback of the stored audio content.

In some implementations, a user such as a parent may instruct a voice-activated product (e.g., one or more devices in the user's "ecosystem" of devices)—and more particularly, voice-activated assistant software ("automated assistant") executing on the voice-activated product—that the user wishes to record an audio rendition of a narrative, such as reading aloud a story book, a song, a play, a speech, etc. to one or more listeners (however, it is not necessary that listeners be present during recording). In some implementations, the automated assistant may solicit bibliographic input from the user (before or after recording). Solicited bibliographic information may include, for instance, a title and/or author of the book, a publisher of the book, an International Standard Book Number ("ISBN"), an alias for the book (e.g., if a listener tends to refer to a book with a word or phrase that is different than its official title), and so forth. The automated assistant may enter a recording state (before or after receiving the bibliographic information from the user) in which it records the user providing an audible rendition of the narrative.

Once the user completes recording the narrative, the user may instruct the automated assistant to cease recording, or recording may cease in response to other events, such as a predetermined time interval without the user speaking, recognition of words or phrases that signify the end of the narrative, etc. In some implementations, the automated assistant may prompt (e.g., audibly, visually, etc.) the user with various information about the recorded audio file, such as its length, etc. In some implementations, the automated assistant may offer to playback the audio recording for the user's approval. Assuming the user approves (or if approval is not solicited), the automated assistant may store the recorded audio file in computer memory, e.g., locally or at one or more computer servers forming a so-called "cloud" infrastructure.

In various implementations, the audio recording may be stored in association with (e.g., indexed by) the bibliographic information provided by the user. In some implementations, the automated assistant may match (or may provide a search query to one or more remote servers to match), in a bibliographic database, the audio recording/bibliographic information to a preexisting written work. Additional information associated with the preexisting written work, such as publisher, year published, cover art, sound effects, etc., may be made available for various purposes, such as visual rendition of cover art (or other illustrations) on a display screen of the voice-activated product or another device of the user's ecosystem. In various implementations, the audio file may be further indexed in the computer memory using one or more pieces of this additional information.

Once the audio file is stored and indexed (locally at the voice-activated product and/or on the cloud), the user and/or another individual may request playback of the audio recording. In various implementations, the individual may search a plurality of recorded audio files using one or more indexed pieces of information, such as bibliographic information provided by the recording user, or the aforementioned additional information that may be associated with a preexisting written work in a bibliographic database. For example, a child could request playback of a particular book that was previously recorded by an adult, using the book's official title or other information (e.g., author), and/or using a nickname (word or phrase) the child has for the book. In some implementations, recorded audio files may be indexed by an identity of the recording user (e.g., "mommy," "daddy," "Uncle Geoff," and so forth), such that a listener can search the audio files by the recording user (e.g., if a child misses her mother, the child can search for books read by "mommy," or can simply utter statements such as "I miss mommy"). In the latter case, the voice-activated assistant may search the audio files for recordings made by the mother, and may provide an interactive dialog (e.g., voice recognition, visually using cover art, etc.) that enables the child to select, for playback, an audio file recorded by the mother.

In some implementations, the automated assistant may enable incorporation of sound effects into an audio file of a user's audible rendition of a narrative, e.g., at particular points in time within the narrative and/or in response to particular words or phrases. For example, in some implementations, a recording user may search the web for sound effects, or may search one or more databases containing the narrative's bibliographic information for sound effects. The recording user may incorporate these sound effects into the audio file, e.g., during recording or later using various user interfaces. In some implementations, a user can select a sound effect prior to or during recording, and can then issue a command for the automated assistant to incorporate the sound effect into the audio file in response to detection of particular words or phrases. For example, a user recording an audible rendition of "Old MacDonald's Farm" may select a number of animal noises (e.g., prerecorded), and may instruct the automated assistant at the outset of recording that particular animal sound effects should be incorporated into the audio file in response to utterance of particular words (e.g., <"cow," "moo">, <"duck," "quack">, etc.).

In some implementations, the automated assistant may be configured to perform voice analysis (e.g., voice recognition, speaker recognition, etc.) to determine that a user issuing one or more voice commands is different than a user who recorded the audio file. In some such implementations, the automated assistant may initiate an interactive dialog tailored towards the different user based on the voice analysis. For example, the interactive dialog may limit the different user to playback of recorded audio files, and may limit access to other unrelated resources that might otherwise be accessible by the automated assistant in response to command received from a so-called "admin" user (e.g., a user with an account that is associated with the automated assistant). In such implementations, a different grammar, which may be more or less robust, have limited vocabulary, offer limited (e.g., binary) choices, etc., may be employed by the automated assistant to interact with the different user during the interactive dialog.

In some implementations, a method performed by one or more processors is provided that includes: in response to receiving an input from a first user indicating that the first user intends to record audio content, causing capture and storage of audio content; receiving input from the first user indicating at least one identifier for the audio content; associating the stored audio content with the at least one identifier; receiving a voice input from a subsequent user; analyzing characteristics of the voice input; in response to determining that the voice input has particular characteristics, biasing speech recognition in respect of the voice input towards recognition of the at least one identifier; and in response to recognizing, based on the biased speech recognition, presence of the at least one identifier in the voice input, causing playback of the stored audio content.

These and other implementations of technology disclosed herein may optionally include one or more of the following features.

In various implementations, the method may further include, in response to the biased speech recognition yielding a non-recognition of the voice input, causing provision of a selectable option to the subsequent user for enabling the subsequent user to cause playback of the stored content. In various implementations, the selectable option includes the at least one identifier. In various implementations, the selectable option may be an audio prompt.

In various implementations, the method may further include, in response to receiving the input from the first user indicating that the first user intends to record audio content, providing a prompt to the first user instructing the first user to provide the input indicating the at least one identifier.

In another aspect, a method may include: receiving, by a voice-activated product at one or more input devices, a first command from a user, wherein the first command notifies the voice-activated product that the user wishes to record an audible rendition of a narrative; receiving, by the voice-activated product at one or more of the input devices, bibliographic input from the user, wherein the bibliographic input is indicative of bibliographic information associated with the narrative; recording, by the voice-activated product via an audio input device, the audible rendition of the narrative spoken by the user; storing, in computer memory available to the voice-activated product, an audio file comprising the recorded audible rendition of the narrative spoken by the user, wherein the audio file is indexed in the computer memory based at least in part on the bibliographic information; and rendering, by the voice-activated product via an audio output device, the audio file in response to a second command received at one or more of the input devices from the same user or a different user, wherein the second command comprises an indication of the bibliographic information.

In various implementations, the first command may include speech received via the audio input device. In various implementations, the method may further include providing, by the voice-activated product at one or more output devices, a solicitation for the bibliographic information associated with the narrative. In various implementations, the solicitation may include an audible prompt provided via the audio output device. In various implementations, the bibliographic input may include speech received via the audio input device. In various implementations, the second command may include speech received via the audio input device.

In various implementations, the narrative may include a preexisting written work, and the method may further include matching the bibliographic information to the preexisting written work in a database. In various implementations, the method may further include providing, by the voice-activated product via one or more of the output devices, additional information associated with the preexisting written work in the database. In various implementations, the additional information may include a visual rendition representing the preexisting written work. In various implementations, the audio file may be further indexed in the computer memory based on additional information associated with the preexisting written work in the database.

In various implementations, the computer memory may be integral with one or more remote servers that are in network communication with the voice-activated product. In various implementations, the computer-memory may store a plurality of recorded audio files that are indexed by corresponding bibliographic information. In various implementations, the plurality of audio files may be further indexed by identities of users that recorded them.

In various implementations, the method may further include incorporating, by the voice-activated product into the audio file, one or more sound effects selected by the user. In various implementations, the method may further include performing voice analysis on the second command to determine that the second command was spoken by a different user than the user. In various implementations, the method may further include initiating, by the voice-activated product, an interactive dialog tailored towards the different user based on the voice analysis.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
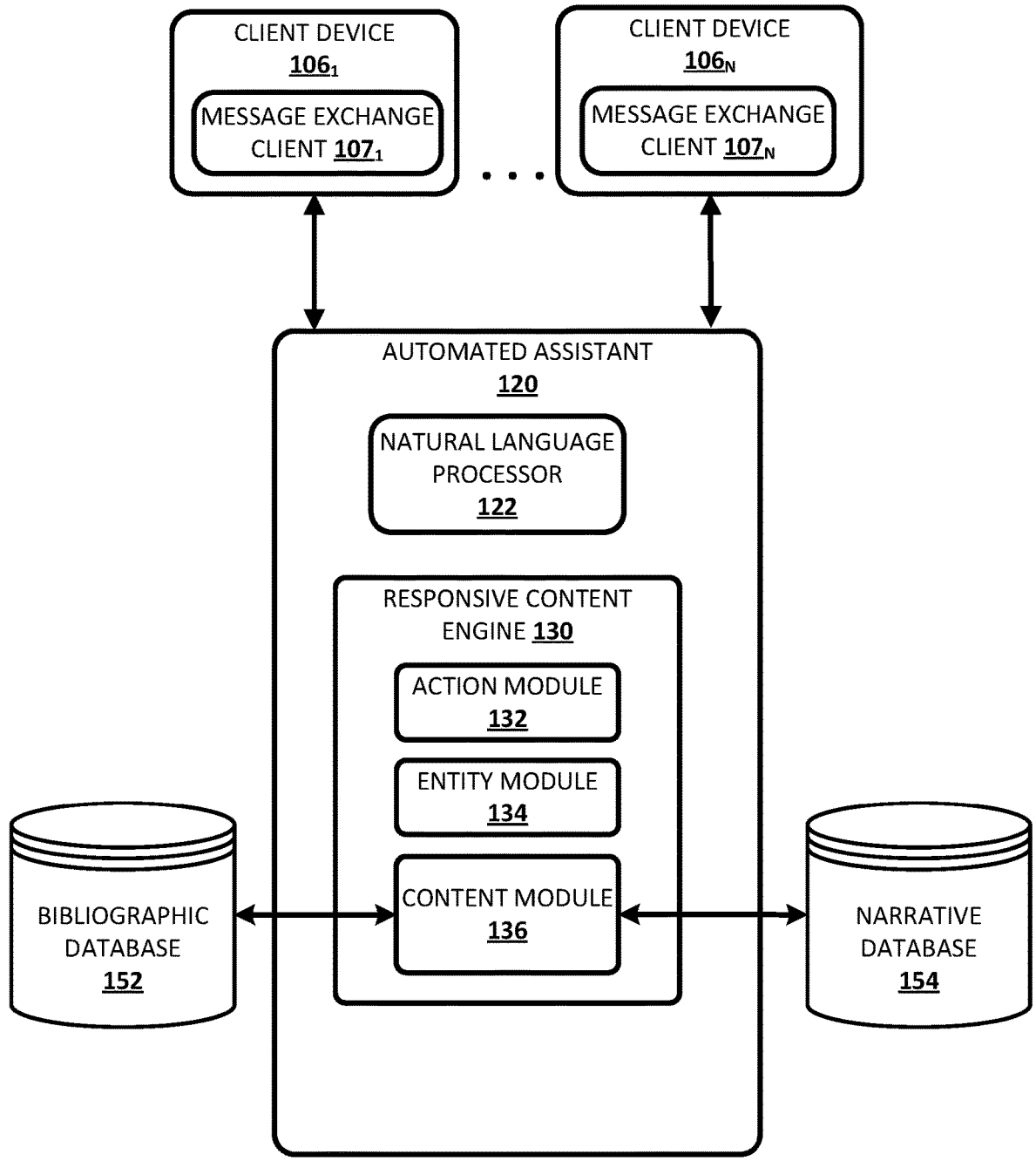
FIG. 1 is a block diagram of an example environment in which implementations disclosed herein may be implemented.

Now turning to FIG. 1, an example environment in which techniques disclosed herein may be implemented is illustrated. The example environment includes a plurality of client computing devices $106_{1-N}$ and an automated assistant 120. Although automated assistant 120 is illustrated in FIG. 1 as separate from the client computing devices $106_{1-N}$, in some implementations all or aspects of the automated assistant 120 may be implemented by one or more of the client computing devices $106_{1-N}$. For example, client device $106_1$ may implement one instance of or more aspects of automated assistant 120 and client device $106_N$ may also implement a separate instance of those one or more aspects of automated assistant 120. In implementations where one or more aspects of automated assistant 120 are implemented by one or more computing devices remote from client computing devices $106_{1-N}$, the client computing devices $106_{1-N}$ and those aspects of automated assistant 120 may communicate via one or more networks such as a local area network (LAN) and/or wide area network (WAN) (e.g., the Internet).

The client devices $106_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), and/or a wearable apparatus of the user that includes a computing device (e.g., a watch of the user having a computing device, glasses of the user having a computing device, a virtual or augmented reality computing device). Additional and/or alternative client computing devices may be provided. In some implementations, a given user may communicate with automated assistant 120 utilizing a plurality of client computing devices that collectively from a coordinated "ecosystem" of computing devices. In some such implementations, the automated assistant 120 may be considered to "serve" that particular user, e.g., endowing the automated assistant 120 with enhanced access to resources (e.g., content, documents, etc.) for which access is controlled by the "served" user. In some cases, the automated assistant 120 may be voice-trained by the user it serves to fine-tune the recognition of that user's speech and improve accuracy. However, for the sake of brevity, some examples described in this specification will focus on a user operating a single client computing device 106.

Each of the client computing devices $106_{1-N}$ may operate a variety of different applications, such as a corresponding one of the message exchange clients $107_{1-N}$. Message exchange clients $107_{1-N}$ may come in various forms and the forms may vary across the client computing devices $106_{1-N}$ and/or multiple forms may be operated on a single one of the client computing devices $106_{1-N}$. In some implementations, one or more of the message exchange clients $107_{1-N}$ may come in the form of a short messaging service ("SMS") and/or multimedia messaging service ("MMS") client, an online chat client (e.g., instant messenger, Internet relay chat, or "IRC," etc.), a messaging application associated with a social network, a personal assistant messaging service dedicated to conversations with automated assistant 120, and so forth. In some implementations, one or more of the message exchange clients $107_{1-N}$ may be implemented via a webpage or other resources rendered by a web browser (not depicted) or other application of client computing device 106.

As described in more detail herein, the automated assistant 120 engages in dialog sessions with one or more users via user interface input and output devices of one or more client devices $106_{1-N}$. In some implementations, the automated assistant 120 may engage in a dialog session with a user in response to user interface input provided by the user via one or more user interface input devices of one of the client devices $106_{1-N}$. In some of those implementations, the user interface input is explicitly directed to the automated assistant 120. For example, one of the message exchange clients $107_{1-N}$ may be a personal assistant messaging service dedicated to conversations with automated assistant 120 and user interface input provided via that personal assistant messaging service may be automatically provided to automated assistant 120. Also, for example, the user interface input may be explicitly directed to the automated assistant 120 in one or more of the message exchange clients $107_{1-N}$ based on particular user interface input that indicates the automated assistant 120 is to be invoked. For instance, the particular user interface input may be one or more typed characters (e.g., @AutomatedAssistant), user interaction with a hardware button and/or virtual button (e.g., a tap, a long tap), an oral command (e.g., "Hey Automated Assistant"), and/or other particular user interface input. In some implementations, the automated assistant 120 may engage in a dialog session in response to user interface input, even when that user interface input is not explicitly directed to the automated assistant 120. For example, the automated assistant 120 may examine the contents of user interface input and engage in a dialog session in response to certain terms being present in the user interface input and/or based on other cues. In many implementations, the automated assistant 120 may engage interactive voice response ("IVR"), such that the user can utter commands, searches, etc., and the automated assistant may utilize one or more grammars to convert the utterances into text, and respond to the text accordingly.

Each of the client computing devices $106_{1-N}$ and automated assistant 120 may include one or more memories for storage of data and software applications, one or more processors for accessing data and executing applications, and other components that facilitate communication over a network. The operations performed by one or more of the client computing devices $106_{1-N}$ and/or by the automated assistant 120 may be distributed across multiple computer systems. Automated assistant 120 may be implemented as, for example, computer programs running on one or more computers in one or more locations that are coupled to each other through a network.

Automated assistant 120 may include a natural language processor 122 and a responsive content engine 130. In some implementations, one or more of the engines and/or modules of automated assistant 120 may be omitted, combined, and/or implemented in a component that is separate from automated assistant 120. Automated assistant 120 may engage in dialog sessions with one or more user(s), via associated client devices $106_{1-N}$, to provide responsive content generated and/or maintained by responsive content engine 130.

In some implementations, responsive content engine 130 generates responsive content in response to various inputs generated by a user of one of the client devices $106_{1-N}$ during a dialog session with the automated assistant 120. The responsive content engine 130 provides the responsive content (e.g., over one or more networks when separate from a client device of a user) for presenting to the user as part of the dialog session. For example, responsive content engine 130 may generate responsive content in in response to free-form natural language input provided via one of the client devices $106_{1-N}$. As used herein, free-form input is input that is formulated by a user and that is not constrained to a group of options presented for selection by the user.

As used herein, a "dialog session" may include a logically-self-contained exchange of one or more messages between a user and the automated assistant 120. The automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of the automated assistant 120, and so forth.

In some implementations, when the automated assistant 120 provides a prompt that solicits user feedback, the automated assistant 120 may preemptively activate one or more components of the client device (via which the prompt is provided) that are configured to process user interface input to be received in response to the prompt. For example, where the user interface input is to be provided via a microphone of the client device $106_1$, the automated assistant 120 may provide one or more commands to cause: the microphone to be preemptively "opened" (thereby preventing the need to hit an interface element or speak a "hot word" to open the microphone), a local speech to text processor of the client device $106_1$ to be preemptively activated, a communications session between the client device $106_1$ and a remote speech to text processor to be preemptively established, and/or a graphical user interface to be rendered on the client device $106_1$ (e.g., an interface that includes one or more selectable elements that may be selected to provide feedback). This may enable the user interface input to be provided and/or processed more quickly than if the components were not preemptively activated.

Natural language processor 122 of automated assistant 120 processes natural language input generated by users via client devices $106_{1-N}$ and may generate annotated output for use by one or more other components of the automated assistant 120, such as responsive content engine 130. For example, the natural language processor 122 may process natural language free-form input that is generated by a user via one or more user interface input devices of client device $106_1$. The generated annotated output includes one or more annotations of the natural language input and optionally one or more (e.g., all) of the terms of the natural language input.

In some implementations, the natural language processor 122 is configured to identify and annotate various types of grammatical information in natural language input. For example, the natural language processor 122 may include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger configured to annotate entity references in one or more segments such as references to people (including, for instance, literary characters), organizations, locations (real and imaginary), and so forth. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver configured to group, or "cluster," references to the same entity based on one or more contextual cues. For example, the coreference resolver may be utilized to resolve the term "it" to the user's audible rendition of "Winnie the Pooh" in the natural language input "I like reading Winnie the Pooh to you, son. Let's record it."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

As mentioned above, the responsive content engine 130 utilizes one or more resources in generating suggestions and/or other content to provide during a dialog session with a user of one of the client devices $106_{1-N}$. In various implementations, the responsive content engine 130 may include an action module 132, an entity module 134, and a content module 136.

The action module 132 of the responsive content engine 130 utilizes natural language input received from client computing devices $106_{1-N}$ and/or annotations of natural language input provided by natural language processor 122, to determine at least one action that is responsive to the natural language input. In some implementations, the action module 132 may determine an action based on one or more terms included in the natural language input. For example, the action module 132 may determine an action based on the action being mapped, in one more computer readable media, to one or more terms included in the natural language input. For instance, an action of "record an audible rendition of a narrative" may be mapped to one or more terms such as "I'd like to record . . . ," "Let's record it," "I'm going to read <someone> a story," "Let's record a singalong," etc. As another example, an action of "render an audio file of a previously-recorded audible rendition of a narrative" may be mapped to one or more terms such as "Read me a story," "Ready me <story keyword>," "Read me a story about <keyword>," "I miss <recording user>," and so forth.

Bibliographic database 152 may be provided on one or more non-transitory computer readable media and may include information associated with a plurality of narratives, such as preexisting works (e.g., books, poems, songs, screenplays, scripts, etc.), and/or associated entities (authors, publishers, producers, characters, etc.), properties of each of the entities, and optionally relationships between those entities. For example, the bibliographic database 152 may include an identifier (e.g., title, ISBN, etc.) of a particular book and one or more properties and/or attributes of that book such as author, co-authors, illustrator(s), genre (e.g., fantasy, targeted age, etc.), length (in words and/or pages), nicknames (or aliases), publishers, publication dates, sound effects, themes, topics, etc. In some implementations, bibliographic database 152 may be stored across one or more server computing systems, e.g., in the cloud, and may be accessible to a plurality of automated assistants 120 operating on a plurality of different client devices 106 and/or that serve a plurality of different users.

Narrative database 154 may be provided on one or more non-transitory computer readable media and may include a library of one or more recorded audio files—which may be stored using a variety of lossy and/or lossless audio formats (e.g., MPEG, MP3, ALAC, FLAC, WMA, etc.)—that include audible renditions of narratives provided by users of client devices 106 interacting with automated assistant 120. For example, each time a user instructs the automated assistant 120 to record an audible rendition of a narrative using techniques described herein, the resultant audio file may be stored and indexed in narrative database 154. Narrative database 154 may be stored in one or more memory locations, such as on one or more client devices 106, on one or more servers (e.g., the cloud), and so forth.

Content module 136 may have access (e.g., through one or more networks or in local computing memory) to both bibliographic database 152 and narrative database 154. In various implementations, content module 136 may be configured to receive, e.g., from action module 132, user commands. In response to those commands, content module 136 may perform a variety of actions, including but not limited to: recording new audio files for storage in narrative database 154; audibly rendering (e.g., playback) previously-recorded audio files stored in narrative database 154; and/or associating recorded audio files stored in narrative database 154 with information contained in bibliographic database 152.

Figure 2:
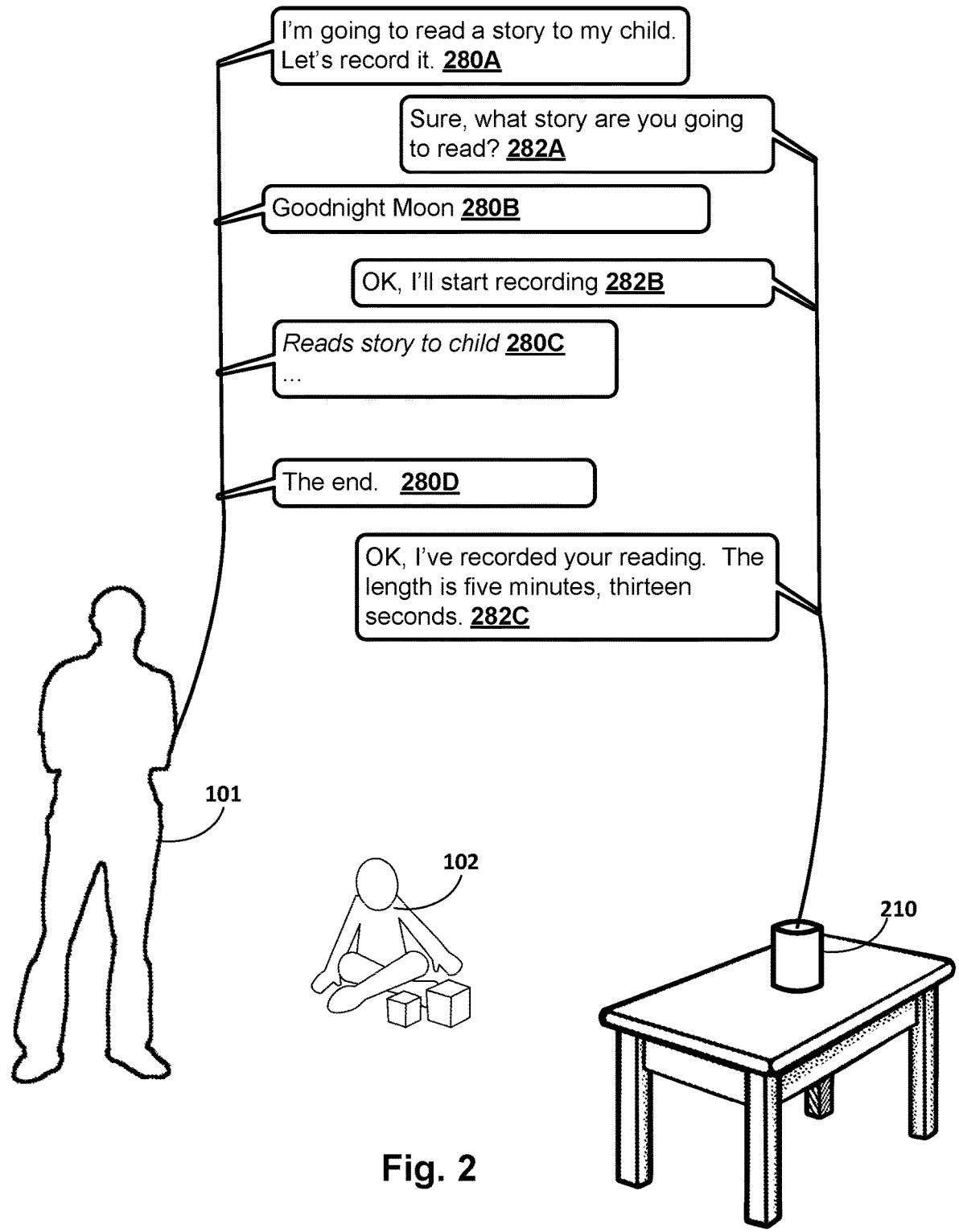
FIGS. 2, 3, 4, and 5 depict example dialogs between various users and automated assistants, in accordance with various implementations.

FIG. 2 illustrates an example of a dialog session in which the automated assistant 120 records an audible rendition of a work (e.g., a book, song, essay, poem, script, screenplay, etc.) by a user 101. A computing device 210 as depicted in FIG. 2 may include one or more microphones and one or more speakers. FIG. 2 illustrates examples of dialog session that may occur, via the microphone(s) and speaker(s), between a user 101 of the computing device 210 and the automated assistant 120 according to implementations described herein. One or more aspects of the automated assistant 120 may be implemented on the computing device 210 and/or on one or more computing devices that are in network communication with the computing device 210. In examples described herein, it may be assumed that the automated assistant "serves" the user 101. For instance, the automated assistant 120 may have privileged access to resources controlled by the user 101, may be trained to understand speech from the user 101 (e.g., tuned to the user's vocabulary, accent, pronunciations, cadence, etc.).

In FIG. 2, the user 101 provides natural language input 280A of "I'm going to read a story to my child (which is indicated at 102). Let's record it" to initiate a dialog session between the user 101 and the automated assistant 120. In response to the natural language input 280A, the automated assistant 120 provides natural language output 282A of "Sure, what story are you going to read." The user 101 then provides natural language input 280B that includes, for instance, bibliographic information such as the title, "Goodnight Moon." The automated assistant 120 then provides natural language output 282B that prompts the user to that it will record the audible rendition of the story read by the user.

The user then provides voice input 280C that includes an audible rendition of the story. Sometime later, e.g., after the user completes reading the story, in some implementations, the user may provide some sort of input, such as natural language input 280D (which in some cases may be a final word or phrase from the story), which the automated assistant 120 may recognize as a trigger to cease recording. The automated assistant 120 may then provide various outputs, such as a temporal length of the recorded audio file. In some implementations, the automated assistant 120 may provide other outputs as well, such as a prompt asking the user if the user would like to hear the audio recording, a prompt confirming that the user wishes to keep the recording, and so forth. In some implementations, the automated assistant 120 may wait until after the recording is complete to solicit bibliographic information, rather than asking for it ahead of time (as indicated at 282A).

Once the session depicted in FIG. 2 is complete, in various implementations, the automated assistant 120 may store, in computer memory (e.g., narrative database 154) available to the computing device 210 (e.g., locally or on one or more servers, e.g., that form a cloud), an audio file comprising the recorded audible rendition of the narrative spoken by the user 101. In some implementations, the audio file may be indexed in the computer memory based at least in part on the bibliographic information provided by the user, e.g., at 280B.

In some implementations, the narrative may include a preexisting written work, such as a published book. In some such implementations, the bibliographic information provided by the user may be matched to the preexisting written work in a database of preexisting works (e.g., 154 in FIG. 1). Additional information associated with the preexisting written work may also be stored in the database. This additional information may include, for instance, additional bibliographic information (e.g., author, ISBN, year published, version, etc.), as well as other additional information, such as one or more nicknames or aliases used for the work (e.g., by the recording user 101 and/or used by other users), cover art and/or other artwork associated with the written work (e.g., illustrations from one or more published versions of the work, fan art, etc.), sound effects (described below), trivia, information about characters in the work (e.g., identifies, species, gender, etc.), themes, topics, keywords or phrases, and so forth.

As will be described in more detail below, in various implementations, various pieces of this additional information may be provided as output by automated assistant 120, e.g., by way of one or more output devices of computing device 210. For example, the additional information that is output may include a visual rendition representing the preexisting written work that is output on a display (not depicted) of computing device 210. If computing device 210 does not include a display, in various implementations, one or more other computing devices, e.g., of an ecosystem of computing devices controlled by user 101, such as a smart phone or nearby smart television, may output the visual rendition on a display. In some implementations, the audio file may be further indexed in the computer memory (e.g., 154) by automated assistant 120 based on one or more pieces of additional information associated with the preexisting written work in the database.

In various implementations, the automated assistant 120 may be configured to render, via an audio output device, one or more previously-recorded audio files (e.g., the audio file recorded during the session depicted in FIG. 2) in response to a command received at one or more of the input devices from the same user or a different user, such as child 102. The command may include an identifier of an audio file that the child 102 wishes to play back. In some implementations, the identifier may include an indication of the bibliographic information that was provided by the recording user when the audio file was recorded.

Figure 3:
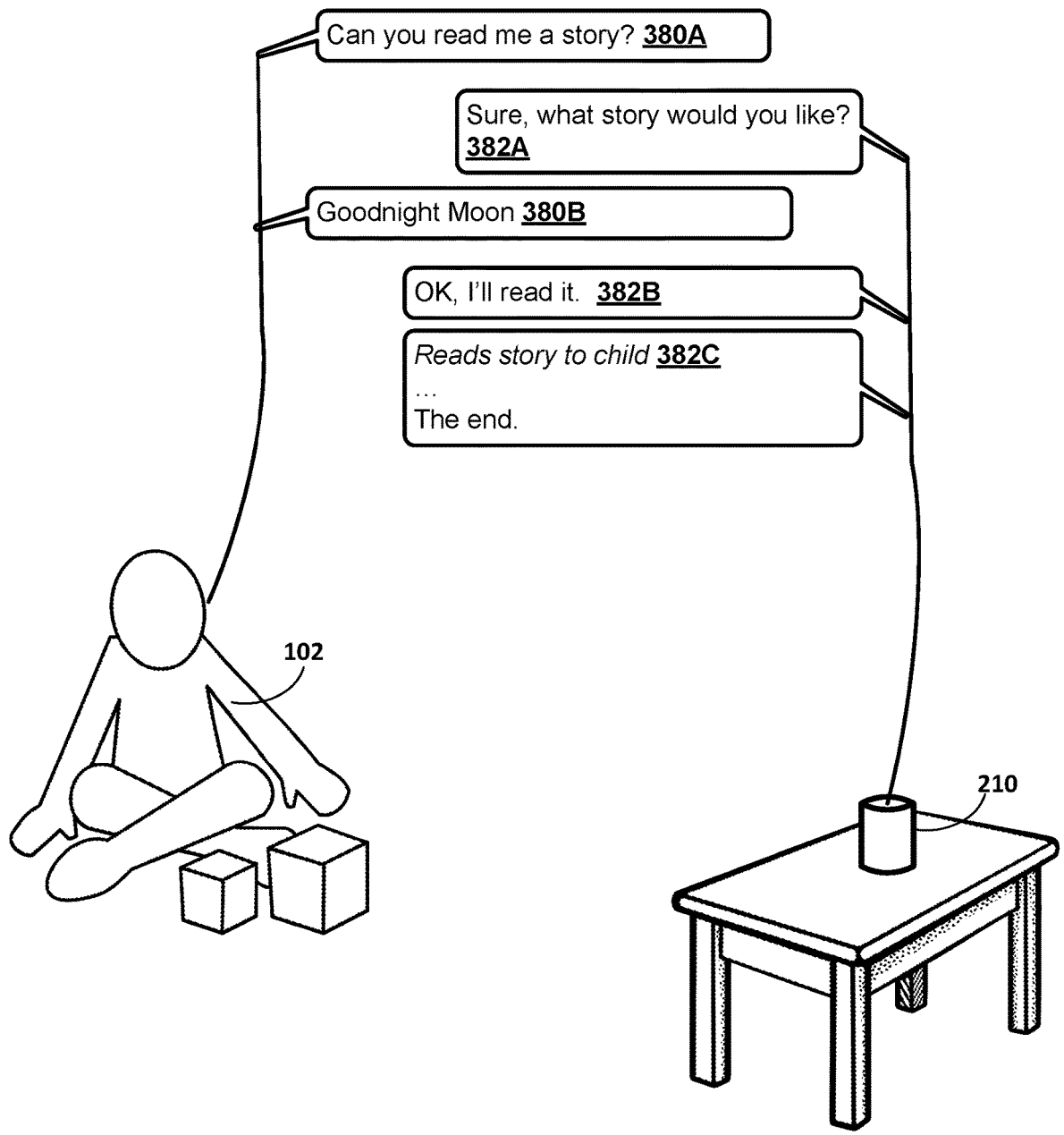

FIG. 3 depicts an example dialog between the child 102 and the automated assistant 120 operating on the computing device 210 during a different session. At 380A, the child 102 speaks the phrase, "Can you read me a story?" Assuming the child's command is ambiguous as to what story the child would like to hear, automated assistant 120 may disambiguate the child's command, for instance by prompting the child to indicate which story the child would like to hear at 382A. At 382B, the child may respond by providing an identifier of the story he or she wishes to hear. For example, the child may provide at 380B bibliographic information such as the title, "Goodnight Moon." At 382B (which may be optional), the automated assistant 120 may provide audible confirmation, and then at 382C, the automated assistant 120 may playback the audio file that is stored in computer memory (e.g., 154) accessible to computing device 210 in association with the identifier (e.g., bibliographic information). In other implementations, if the child 102 starts out by providing a less ambiguous command, such as "read me Goodnight Moon," 382A and 380B may be skipped, as disambiguation may not be necessary.

Figure 4:
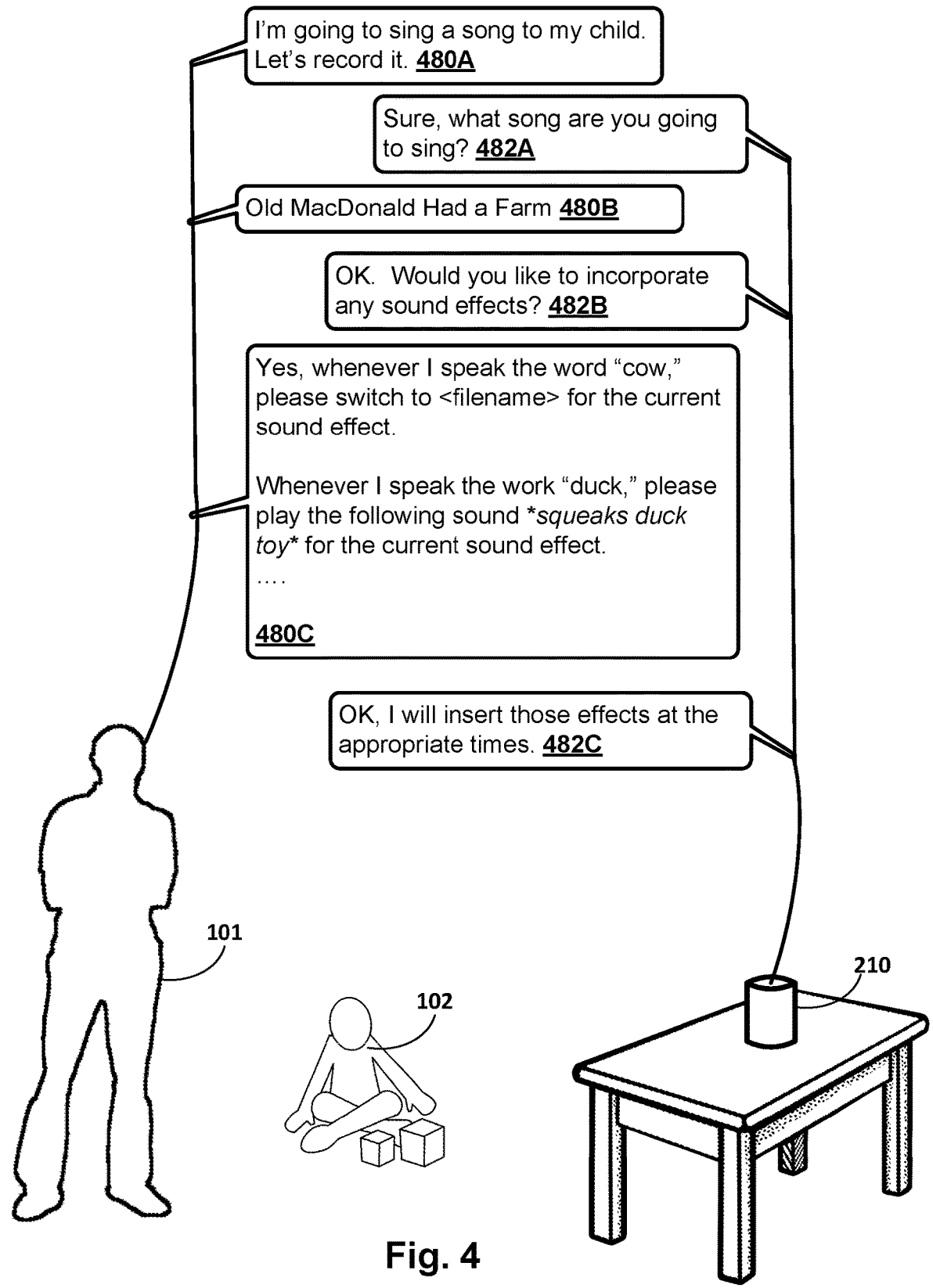

FIG. 4 depicts a more complex recording dialog between the user 101 and automated assistant 120 executing on computing device 210. In this example, at 480A, the user 101 issues a command that he is going to sing a song to his child. At 482A, the automated assistant 120 seeks to disambiguate which song will be sung, e.g., by seeking bibliographic information. At 480B, the user 101 provides bibliographic information ("Old MacDonald Had a Farm").

In some implementations, and as noted above, the automated assistant 120 may match the biographic information to an existing work in a database. In some implementations, the automated assistant 120 may provide recording options that may be specifically applicable to that existing work, or to existing works of that genre. For example, in response to matching the user-provided bibliographic information to the well-known children's song, "Old MacDonald Had a Farm," the automated assistant 120 may determine, e.g., based on additional information stored in association with the existing work in bibliographic database 152, that sound effects often accompany the song. Thus, at 482B, the automated assistant 120 may prompt the user 101 to see if the user 101 would like to incorporate any sound effects into the audio recording.

At 480C, the user 101 may confirm that he wishes to incorporate sound effects. Users may incorporate sound effects into recorded audio files in various ways. In a simple example, the user (or a listener to which the user is reading) may provide the sound effects audibly during recording, such that the sound effects are simply baked into the recording as ambient noise. However, in other implementations, such as that depicted in FIG. 4, more options for incorporation of sound effects may be provided by the automated assistant 120.

For example, the user 101 instructs the automated assistant 120 that whenever the user speaks the word "cow," the automated assistant 120 should play a preexisting audio file ("<filename>" indicates a place holder for the audio file to be played) at an appropriate point during the song. In this instance, the preexisting audio file may, when played back, render the sound of a cow mooing. In some implementations, such a preexisting audio file may be obtained (e.g., downloaded from a sound effect library) by the user 101 and stored in computer memory available to the automated assistant 120, e.g., on computing device 210, on another computing device of an ecosystem of computing devices operated by the user 101, and/or on the cloud. In other implementations, the preexisting audio file may be stored in bibliographic database 152 in association with the additional information described above.

For "Old MacDonald Had a Farm," when the user 101 (and/or the listening child 102) sings the phrase, "and on his farm he had a cow," the automated assistant 120 may perform audio analysis on the audible rendition of the song. In some implementations, the automated assistant 120 may utilize additional information stored in the bibliographic database to determine when to play the current sound effect. For example, the automated assistant 120 may determine that whenever the user 101 (or child 102) says "with a . . . ," the automated assistant 120 should audibly render the preexisting audio file. Accordingly, while the user 101 sings the song to the child 102, the sound effect will be incorporated in real time, enhancing the experience. Moreover, the playback of the preexisting audio file may be incorporated into the recording of the song, e.g., as ambient noise recorded along with the user's voice and/or stitched into the resulting audio file using real time and/or downstream sound file processing.

As another example, the user 101 instructs the automated assistant 120 that whenever the user speaks the word "duck," the automated assistant 120 should play the sound emanated from a device operated by the user that creates a "quack" sound (e.g., a squeezable rubber ducky, a duck call, etc.). In such an implementation the automated assistant 120 may record the user-created sound immediately preceded by the phrase, "following sound." The automated assistant 120 may then audibly render the recorded sound while the user 101 sings to the child 102, and may bake the sound into the audible recording of the song, e.g., by way of ambient noise and/or by way of stitching to recorded sound into the resulting audio file. At 482C, the automated assistant 120 confirms that it will insert the requested sound effects and the appropriate times.

Figure 5:
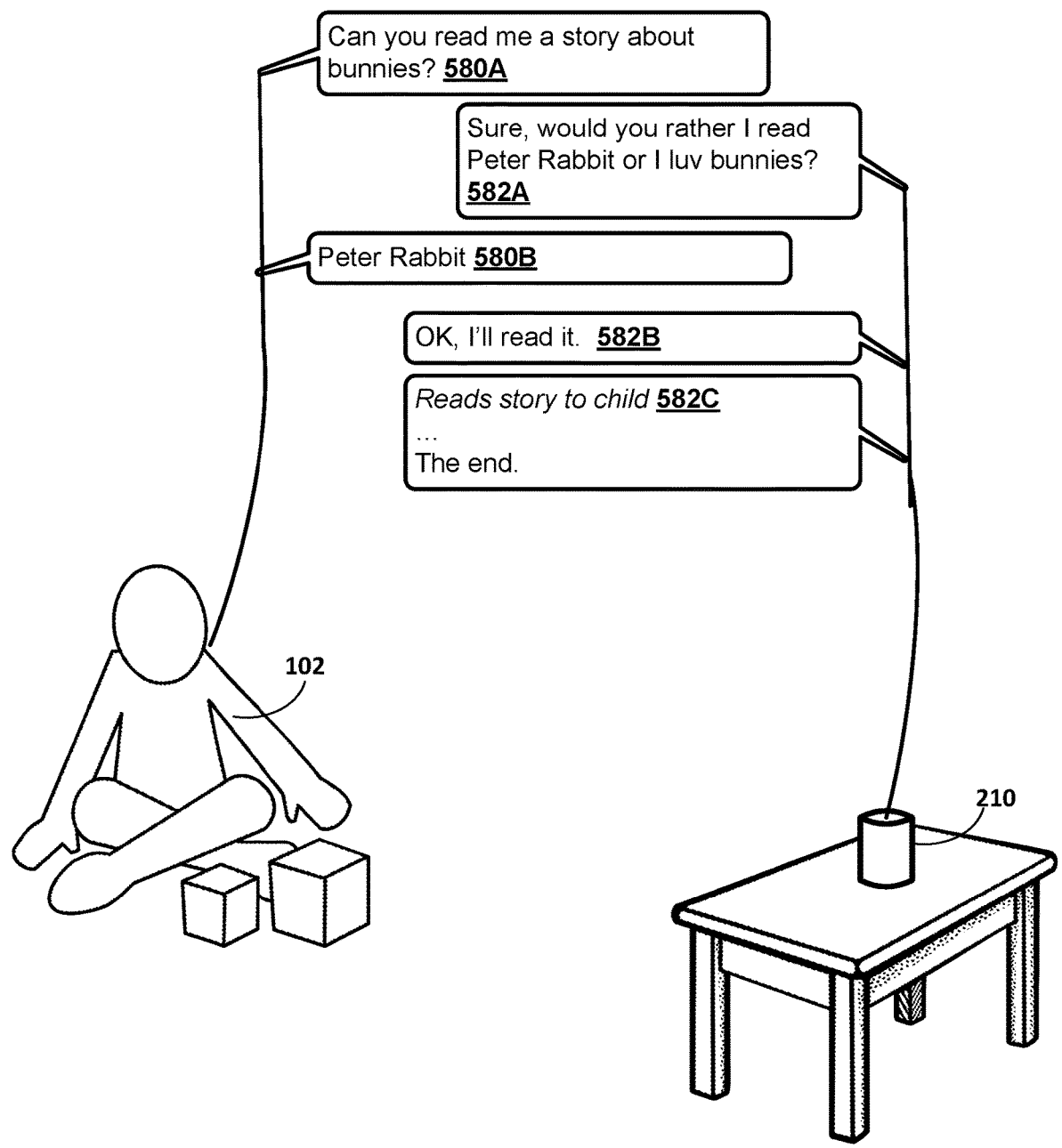

FIG. 5 depicts another example dialog between the child 102 and an automated assistant 120 operating on the computing device 210. The dialog depicted in FIG. 5 demonstrates an ability in some implementations for the automated assistant 120 to search a library (e.g., 154) of previously recorded audio files of audible renditions of various narratives. At 580A, the child 102 requests that the automated assistant 120 read a story about bunnies. In some implementations, the automated assistant 120 may switch to a mode (e.g., a "generalized" or "sandbox" mode) in which it caters specifically towards unknown users, rather than to user 101 (who may be an adult and/or an owner of an account served by automated assistant 120).

For example, in some implementations, the automated assistant 120 may perform voice processing (e.g., speaker recognition, voice recognition, speech recognition) on the voice command 580A received from child 102 to determine that the received voice command was spoken by an individual (e.g., child 102) that is different than another individual (e.g., user 101) that recorded one or more audio files using techniques described herein (or in some cases, another individual that is served by the automated assistant 120). In some such implementations, the automated assistant 120 may responsively initiate an interactive dialog that is tailored towards the child 102. In FIG. 5, for instance, the automated assistant 120 responds at 582A by attempting to disambiguate the child's request by searching a library (e.g., 154) of previously recorded audio files, and returning two responsive results that relate somehow to "bunnies." For example, when these audio files were previously recorded by the user 101, the user 101 may have provided bibliographic information that included, for instance, keywords such as "bunnies," "rabbits," and so forth, or the narratives may include the term "bunnies" (or synonyms thereof) in their titles, or even within their text. The child 102 can then respond at 580B with a disambiguating answer, which the automated assistant 120 may optionally confirm at 582B and then render at 582C.

As noted above, in some implementations, the automated assistant 120 may, in response to voice processing of a received audio command, switch to a "generalized" mode in which it caters towards individuals other than the user 101 served by the automated assistant 120. Recall that automated assistant 120 may be trained to better understand vocabulary used by the user 101 that the automated assistant 120 serves. Thus, in the generalized mode, the automated assistant 120 may utilize one or more grammars, vocabularies, and/or decision trees that are different than those normally employed by the automated assistant 120 to interact with the user 101 served by the automated assistant 120. In some implementations, when in the generalized or sandbox mode, the automated assistant 120 may tailor its dialog in a manner that limits an unknown user's access to various content, such as content controlled by the user 101 served by the automated assistant 120 and/or general content available on the Internet.

In some implementations, in response to determining that the speaker is an individual other that the user 101, the automated assistant 120 may implement a simplistic dialog that solicits binary input (e.g., yes or no) from the individual, rather than natural language input. For example, the automated assistant 120 may initiate a dialog such as the following:

Automated assistant 120: "Sounds like you want to hear a story. Is that right?"
Individual (not user 101): "yes"
Automated assistant 120: "Ok. I have three stories. The first is Macbeth. Do you want to read that?"
Individual (not user 101): "yes"

Such a dialog may simplify access to audio files created techniques described herein. Additionally, such a dialog may limit the individual's ability to access content other than audio files created using techniques described herein. Furthermore, when interacting with an individual other than the user 101, the automated assistant 120 may be able to more easily interpret simple binary responses such as "yes," "no," "okay," etc., than it would be able to interpret natural language input from the individual (which may have an unrecognized accent, pronunciation, vocabulary, speaking cadence, pitch, etc.).

As another example, when the automated assistant 120 determines that a speaker is someone different than the user 101, the automated assistant 120 may bias search results towards audio recordings generated using techniques herein. Additionally or alternatively, the automated assistant 120 may bias search results away from (even to the point of excluding) other content, such as content generally available on the Internet and/or content that may be personal to a particular user (e.g., confidential and/or sensitive content). For example, suppose the user 101 served by the automated assistant 120 issues a voice command to search for a particular keyword. The automated assistant 120 may provide responsive search results gathered from any number of sources, such as the Internet, cloud storage controlled by the user, emails or other documents controlled by the user, and so forth. By contrast, suppose a child (e.g., 102) or another individual not served by the automated assistant 120 issues the same voice command with the same keyword. The automated assistant 120 may perform voice processing to determine that the speaker is not the user served by the automated assistant 120. Consequently, the automated assistant 120 may bias the search results towards audio files recorded using techniques described herein, and may bias the search results against (or outright exclude) other content.

Figure 6:
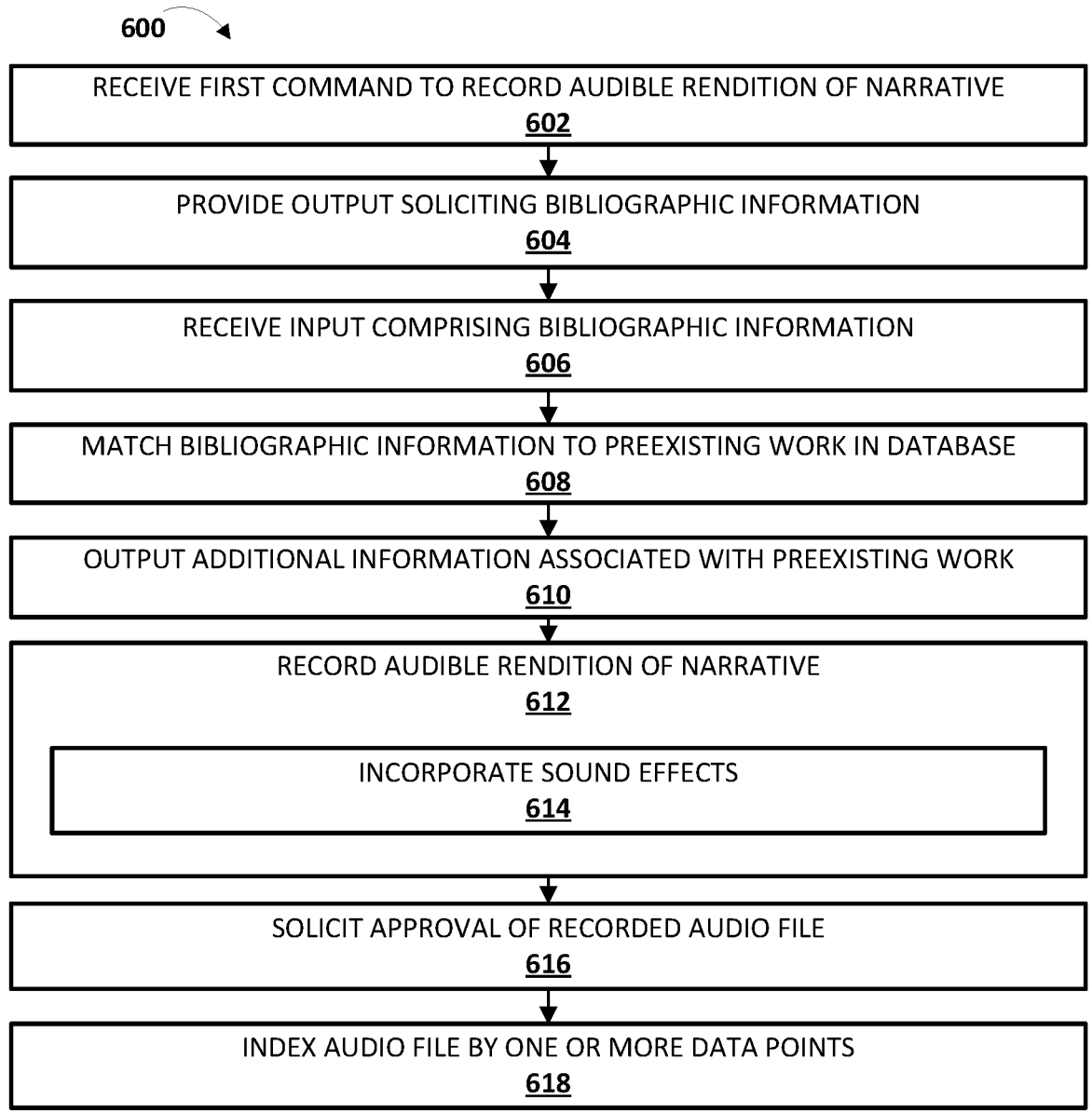
FIGS. 6 and 7 are flowcharts illustrating example methods according to implementations disclosed herein.

FIG. 6 is a flowchart illustrating an example method 600 according to implementations disclosed herein. For convenience, the operations of the flow chart are described with reference to a system that performs the operations. This system may include various components of various computer systems, such as one or more components of automated assistant 120. Moreover, while operations of method 600 are shown in a particular order, this is not meant to be limiting. One or more operations may be reordered, omitted or added.

At block 602, the system may receive input comprising a first command to record an audible rendition of a narrative. This input may be received in various forms at various types of input devices, such as touch screens, microphones, keyboards, mice, accelerometers (e.g., detecting gestures), cameras (e.g., detecting gestures), and so forth. In some implementations, at block 604, the system may provide output that solicits bibliographic about the narrative to be recorded. For example, an automated assistant 120 may prompt a user with a question or statement such as "what are you going to read/sing/perform?" In some embodiments, one or more parameters of the output provided at block 604 may be selected based on input provided at block 602. For example, suppose a user issued the command, "I'm going to read a story, let's record it." Based on the word "story," the output provided at block 604 may include a statement such as "What story are you going to read?" In other implementations, the output of block 604 may be provided using output devices other than speakers, such as displays (e.g., touchscreens), haptic feedback mechanisms, printers, and so forth.

At block 606, the system may receive input from the user that comprises bibliographic information associated with the narrative to be recorded. In some implementations, the user may provide this information as part of the command provided at block 602. For example, a user may proactively state, "I'm going to sing 'Mary had a little lamb' to my daughter. Let's record it." In such case, block 606 may be omitted as the user has already provided bibliographic information.

The user may provide various types of input at block 606 using various types of input devices, including microphones, touchscreen displays, keyboards, mice, accelerometers, cameras, and so forth. For example, in some implementations, when prompted for bibliographic information, the user may simply hold a copy of a book in front of a camera. The camera may capture one or more images of the book, and may perform various types of visual analysis, such as optical character recognition, reading of visual indicia on the book such as bar codes and/or quick review ("QR") codes, and so forth, to automatically detect bibliographic information. Additionally, in various embodiments, the bibliographic information provided by the user may include any identifier that is usable to identify a preexisting work, such as a title, a theme, an author, a publisher, an ISBN number, and so forth.

At block 608, the system (e.g., content module 136) may match the bibliographic information received at block 608 to one or more preexisting works in a database (e.g., bibliographic database 152 of FIG. 1). In various implementations, additional information obtained from the matching entry(s) of bibliographic database 152 may be used, for instance, to index the audio file that is ultimately recorded by the user. As an example, a user-provided book title may be matched to one or more preexisting works having entries in bibliographic database 152. After the user records the audio rendition of the book, various additional information obtained from bibliographic database 152 about the preexisting work may be associated with the recorded audio file, e.g., in narrative database 154.

In some embodiments, the system may match other types of bibliographic information to one or more entries in bibliographic database 152. For example, a user may provide an alias or other keyword that may match one or more aliases or keywords stored in bibliographic database. For example, the user may provide a name of a character, an alternative title, a subtitle, and so forth. If a user-provided character matches multiple entries in bibliographic database 152 (e.g., multiple books featuring the character), then additional information associated with all the matching entries, or only the x closest matching entries, may be associated ultimately with the recorded audio file, or the user may be provided an opportunity to disambiguate further.

In some implementations, at block 610, the system may output various additional information associated with the matching preexisting work. For example, in some implementations, a computing device (e.g., 210) equipped with a display may render cover art and/or other art/illustrations/pictures associated with the matching preexisting work. In some implementations, the additional information may be output in order for the recording user to confirm that the correct preexisting work is being associated with the recording. If additional information associated with an incorrect preexisting work is output, the user may be put on notice that the wrong preexisting work was matched at block 608, and may provide additional commands and/or bibliographic information to the automated assistant 120, e.g., so that the automated assistant 120 may attempt to match the correct preexisting work.

At block 612, the system may record the audible rendition of the narrative provided by the recording user. For example, the automated assistant may transition into a recording state in which it uses a microphone (integral with a computing device 210 or standalone) to record noise. In some implementations, the automated assistant 120 may stop recording when there is a pause having a time interval that satisfies a threshold. In other implementations, the automated assistant 120 may stop recording in response to the recording user deliberately issuing a command to stop recording (e.g., "recording complete"), or in response to a key word or phrase (e.g., "The End."). In some implementations, the automated assistant 120 may have access to content associated with the preexisting work being recorded, and may analyze that content to determine a terminal word or phrase of the preexisting work. That terminal word or phrase may then be detected from the recording user to trigger the automated assistant 120 to stop recording.

In some implementations, at block 614, the automated assistant 120 may incorporate one or more sound effects into the recording. For example, and as was described previously, the recording user may simply create sound effects manually while providing the audible rendition of the narrative. Additionally or alternatively, the recording user may instruct the automated assistant 120 to incorporate sound effects (e.g., audio files of short duration) into the narrative at various points, such as after certain words or phrases (as described above with respect to FIG. 4).

In addition to the non-limiting sound effects described thus far, in some implementations, other types of sound effects may be incorporated into the recording, such as music, voice modification, and so forth. For example, suppose a to-be-recorded narrative features dialog from multiple different characters. Suppose further that a single user will be providing the audible rendition of this multi-character dialog. In some implementations, the automated assistant 120 may (e.g., post processing after recording is complete) apply various types of voice modification to the user's voice to audibly distinguish (e.g., alter pitch, add effects, increase/decrease volume, etc.) dialog spoken by one character from that spoken by another character.

As another example, in some implementations, multiple users may record an audible rendition of the users speaking lines associated with multiple characters (e.g., a script or screenplay). In some implementations, the automated assistant 120 may distinguish between lines spoken by different characters/actors, and may annotate lines (e.g., which may be contained in portions of audio files) with information such as the character (or actor playing the character) that speaks the line, what lines come before/after it, etc. Later, when the automated assistant 120 is instructed to playback the multi-speaker reading, a user may instruct the automated assistant to read only lines spoken by some characters (or actors), but to read those lines in sync from real time lines delivered by the listening user.

For example, suppose that during a first session with the automated assistant 120, two actors record themselves reading lines from a scene of Shakespeare's Macbeth. Later, a first actor playing Macbeth may, without the second actor playing Lady Macbeth being present, instruct the automated assistant 120 to playback only those portions of the audio file that contain lines spoken by Lady Macbeth, and to read them in synch with Macbeth's lines read by the first actor in real time. The automated assistant 120 may, e.g., based on a script of Macbeth stored on bibliographic database 152, detect, in real time, lines spoken by the first actor that match Macbeth's lines, and may play responsive lines of Lady Macbeth immediately thereafter. Thus, for one scene, the dialog between the first actor and the automated assistant 120 may unfold as follows:

| | |
|---|---|
| LADY MACBETH (via automated assistant 120) | A foolish thought, to say a sorry sight. |
| MACBETH (spoken in real time by the present actor) | There's one did laugh in's sleep, and one cried 'Murder!' That they did wake each other: I stood and heard them: But they did say their prayers, and address'd them Again to sleep. |
| LADY MACBETH (via automated assistant 120) | There are two lodged together. |
| MACBETH (spoken in real time by the present actor) | One cried 'God bless us!' and 'Amen' the other; As they had seen me with these hangman's hands. Listening their fear, I could not say 'Amen,' When they did say 'God bless us!' |
| LADY MACBETH (via automated assistant 120) | Consider it not so deeply. |

Referring back to FIG. 6, once recording of the audible rendition of the narrative is complete, at optional block 616, the system may solicit approval of the recorded audio file. In some implementations, the system may playback the entire audio file and let the user approve or disapprove afterwards. In other implementations, the system may provide one or more user interfaces (audio, graphical, etc.) that enable the recording user to modify the audio file, e.g., by deleting portions, splicing multiple audio files together, and so forth. In yet other implementations, the system may provide the user with other information, such as a duration of the recording, a matched preexisting work, and so forth. At block 618, the system may index the recorded audio file in narrative database 154 by one or more data points, including but not limited to bibliographic information provided by the user, aliases or other keywords provided by the user, themes, topics, bibliographic information obtained from bibliographic database 152, an identity of the recording user (e.g., "mommy," "daddy," etc.), and so forth.

Figure 7:
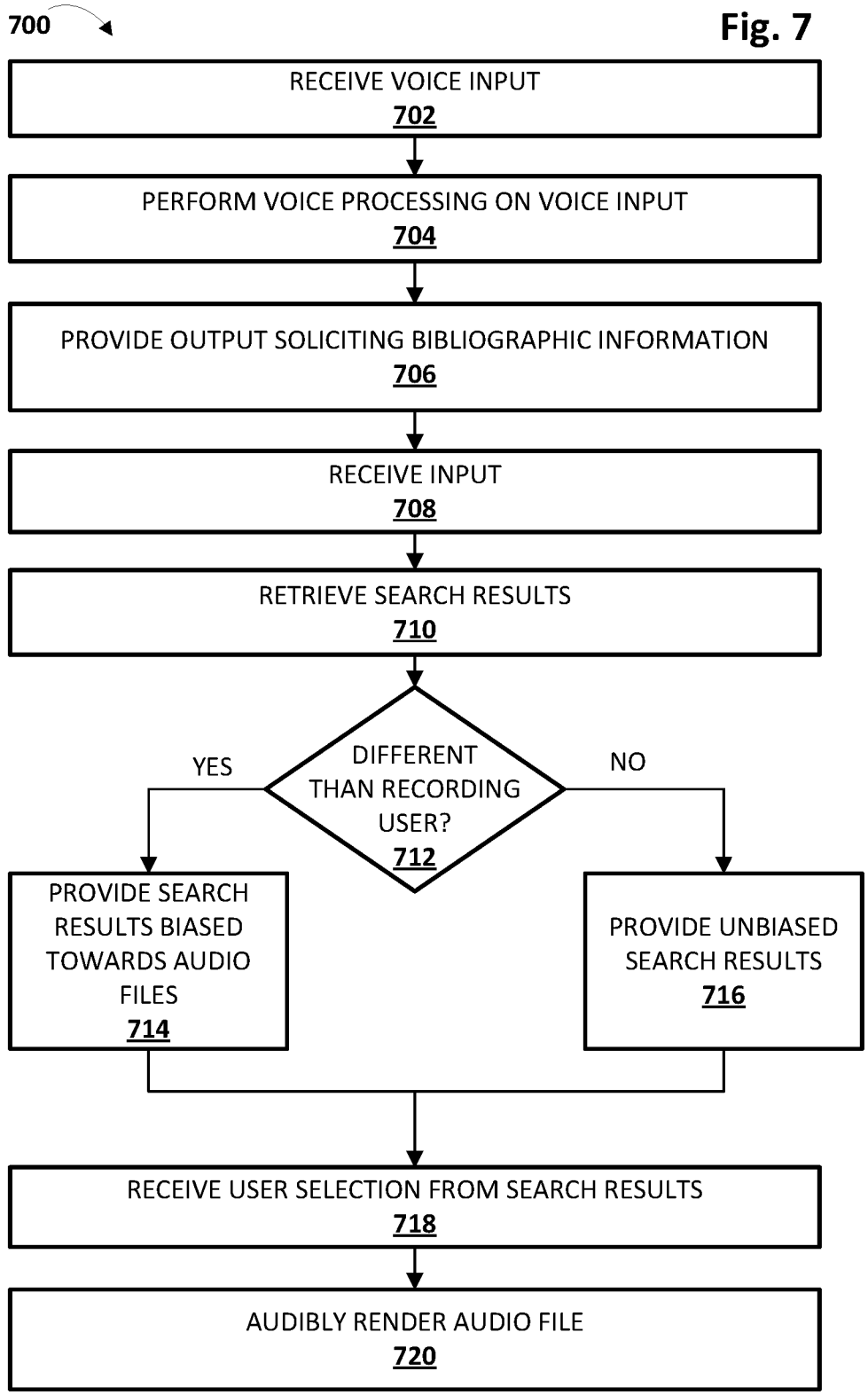

FIG. 7 is a flowchart illustrating an example method 700 according to implementations disclosed herein. For convenience, the operations of the flow chart are described with reference to a system that performs the operations. This system may include various components of various computer systems, such as one or more components of automated assistant 120. Moreover, while operations of method 700 are shown in a particular order, this is not meant to be limiting. One or more operations may be reordered, omitted or added.

At block 702, the system may receive voice input. In various implementations, the voice input may include an explicit command or other statement that implicitly suggests the speaker would like to playback an audio file created using techniques described herein. In some implementations, a variety of phrases may be mapped to a command to render an audio file. For example, phrases such as "I miss mommy" or "I like how daddy reads stories" may be mapped to a command to render an audio file that was recorded (and indexed) by the child's respective parent.

At block 704, the system may perform voice processing (e.g., speaker recognition) on the voice input to determine, for instance, whether the speaker is different than one or more users (e.g., adults, parents) that previously recorded audio files containing renditions of narratives as described herein. Additionally or alternatively, in some implementations, the system may detect, e.g., using various characteristics of the voice input, such as vocabulary, pitch, cadence, etc., whether the speaker is likely a child.

Assuming the voice input received at block 702 does not explicitly identify an audio file, at block 706, the system may provide output soliciting bibliographic input from the user that can be used to identify a desired audio file. This output may in many implementations be audio output, but in other implementations the output may come in other forms, such as visual, etc. At block 708, the system may receive (typically but not exclusively) audio input that includes what is effectively a search query, and which may include bibliographic information such as a title, author, recording user, alias, theme, etc. At block 710, the system may retrieve responsive results, e.g., from narrative database 154.

At block 712, the system may determine whether, based on the voice processing of block 702, the speaker is different than the recording user, and/or different than a user associated with (e.g., served by) the automated assistant 120. If the answer is yes, then method 700 may proceed to block 714. At block 714, the system may provide search results that are biased towards audio files recorded using techniques described herein (e.g., stored in narrative database 154). In some implementations, the system may bias the search results away from other content, such as content (e.g., other documents, emails, settings, media, etc.) controlled by the user served by the automated assistant 120 and/or content generally available on the Internet. In some implementations, this biasing away may go as far as excluding at least some content not contained in narrative database 154 from the search results.

Additionally or alternatively, in some implementations, the system may bias speech recognition of voice input provided by a speaker based on one or more audio characteristics of the speaker's voice. For example, the system may perform speech recognition on the voice input received at block 702 and/or 708. The system may also analyze audio characteristics of the voice input, e.g., pitch, cadence, pronunciation, vocabulary, etc., to determine characteristics of the speaker, such as identity, gender, approximate age, and so forth. In response to determining that the voice input has particular audio characteristics (e.g., that it is a child speaking), the system may bias the speech recognition towards recognition of an identifier (e.g., bibliographic information) associated with an audio file recorded using techniques described herein.

Referring back to FIG. 7, if the answer at block 712 is no (i.e., the user is the same that recorded the audio files and/or is the user served by the automated assistant 120), then method 700 may proceed to block 716. At block 716, the system may provide unbiased search results, which may include, for instance, content controlled by the user served by the automated assistant other than content contained in narrative database 154, content available on the Internet, and so forth.

At block 718, the system may receive input that includes a user selection from the search results. For example, in some implementations, at blocks 714/716, the system may provide an audio list of the search results (including responsive previously-recorded audio files from narrative database 154), and the user may provide audio input selecting from those results. In other implementations, at blocks 714/716, the system may provide a graphical user interface with a visual list of the search results, and that user may select from those results, e.g., using a mouse, touchscreen input, or by speaking the desired result.

At block 720, the system may audibly render the selected audio file. In some implementations, the system may provide other output after audibly rendering the audio file. For example, the system may provide various facts, trivia, or other information related with the preexisting work and/or the author. For example, after rendering an audio file of a recording of "Mary Had a Little Lamb," the automated assistant 120 may output a piece of trivia such as "Did you know that the author of that song, 'Mary Had A Little Lamb' is also responsible for why Americans celebrate Thanksgiving?"

In some implementations, at block 716, the system may provide information that is directly responsive to a query (e.g., received at block 702 or 708) that is unrelated to recorded audio files (in which case at least block 706 may be omitted), and then may offer search results corresponding to audio files recording using techniques described herein. For example, suppose a user provides a general search query about an author, such as "How old was Mark Twain when he died?" The automated assistant 120 may first respond by providing an answer ("74"). Then, the automated assistant 120 may determine that one or more audio files stored in narrative database 154 are related to (e.g., written by, mention, etc.) Mark Twain. Based on that determination, the automated system may follow up by providing output (e.g., "By the way, you have recorded two titles written by Mark Twain. Shall I read one?") asking whether the user would like to playback one or more Mark Twain-related audio files.

Figure 8:
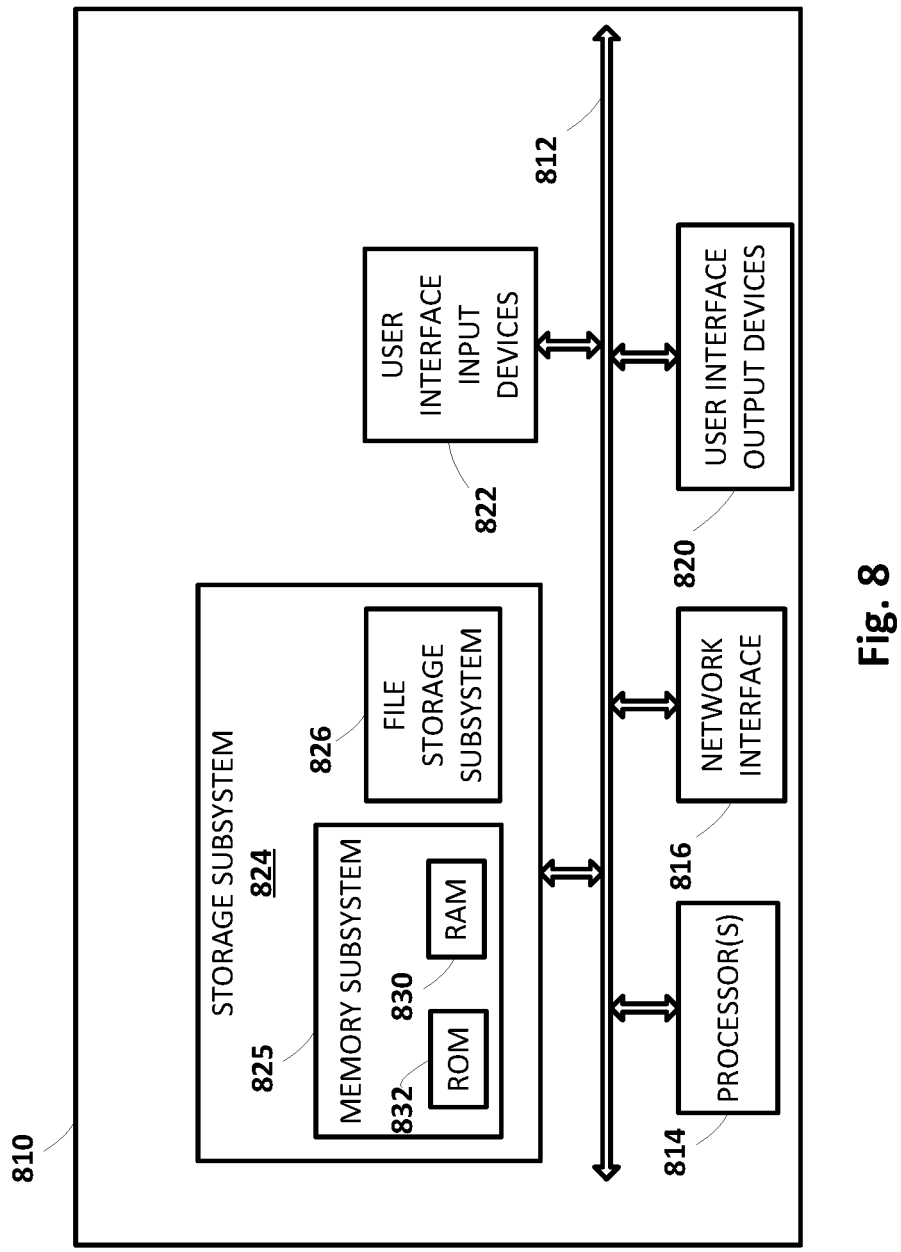
FIG. 8 illustrates an example architecture of a computing device.

FIG. 8 is a block diagram of an example computing device 810 that may optionally be utilized to perform one or more aspects of techniques described herein. In some implementations, one or more of a client computing device, automated assistant 120, and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the methods of FIGS. 6 and 7, as well as to implement various components depicted in FIG. 1.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined. In the context of the present disclosure, any relationships captured by the system, such as a parent-child relationship, may be maintained in a secure fashion, e.g., such that they are not accessible outside of the automated assistant using those relationships to parse and/or interpret natural language input. For example, the automated assistant may not divulge answers to questions such as "who is Sally's mother?", even if the automated assistant has learned that information for purposes of practicing techniques described herein (e.g., the mom says, "I want to record a story for my daughter, Sally." The same goes for other demographic information (e.g., age, gender, abilities, etc.) learned by the automated assistant about users while practicing techniques described herein.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method comprising:
   in response to receiving an input from a first user indicating that the first user intends to record audio content targeted towards one or more children, causing capture and storage of audio content in a library of one or more recorded audio files;
   receiving input from the first user indicating at least one bibliographic word or phrase that identifies the audio content;
   associating the stored audio content with the at least one bibliographic word or phrase in the library of one or more recorded audio files;
   receiving a voice input from a subsequent user;
   analyzing characteristics of the voice input;
   detecting one or more characteristics of the voice input;
   determining, based on the detected one or more characteristics, that the subsequent user is a child;
   in response to determining that the subsequent user is a child, biasing speech recognition in respect of the voice input towards recognition of one or more bibliographic words or phrases associated with one or more stored audio files in the library that were recorded for one or more children, wherein the one or more bibliographic words or phrases include the at least one identifier;
   recognizing, based on the biased speech recognition, the at least one bibliographic word or phrase in the voice input;
   searching the library based on the recognized at least one bibliographic word or phrase to locate the stored audio content; and
   causing playback of the stored audio content.

2. The method of claim 1, further comprising:
   in response to receiving the input from the first user indicating that the first user intends to record audio content, providing a prompt to the first user instructing the first user to provide the input indicating the at least one bibliographic word or phrase.

3. A computer-implemented method, comprising:
   receiving, by a voice-activated product at one or more input devices, a first command from a user, wherein the first command notifies the voice-activated product that the user wishes to record an audible rendition of a narrative targeted towards one or more children;
   receiving, by the voice-activated product at one or more of the input devices, bibliographic input from the user, wherein the bibliographic input is indicative of bibliographic information associated with the narrative;
   recording, by the voice-activated product via an audio input device, the audible rendition of the narrative spoken by the user;
   storing, in computer memory available to the voice-activated product, an audio file comprising the recorded audible rendition of the narrative spoken by the user, wherein the audio file is indexed in the computer memory based at least in part on the bibliographic information;

receiving, by the voice activated product at one or more of the input devices, a voice input from a subsequent user;

detecting one or more characteristics of the voice input;

determining, based on the detected one or more characteristics, that the subsequent user is a child;

in response to determining that the subsequent user is a child, biasing speech recognition in respect of the voice input towards recognition of one or more bibliographic identifiers associated with one or more stored audio files that were recorded for one or more children, wherein the one or more bibliographic identifiers include the bibliographic information associated with the narrative;

recognizing in the voice input, based on the biased speech recognition, the bibliographic information associated with the narrative;

searching the computer memory based on the recognized bibliographic information to locate the stored audio file; and rendering, by the voice-activated product via an audio output device, the audio file.

4. The computer-implemented method of claim 3, wherein the first command comprises speech received via the audio input device.

5. The computer-implemented method of claim 3, further comprising providing, by the voice-activated product at one or more output devices, a solicitation for the bibliographic information associated with the narrative.

6. The computer-implemented method of claim 3, wherein the bibliographic input comprises speech received via the audio input device.

7. The computer-implemented method of claim 3, wherein the narrative comprises a preexisting written work, and the method further comprises matching the bibliographic information to the preexisting written work in a database.

8. The computer-implemented method of claim 7, further comprising providing, by the voice-activated product via one or more of the output devices, additional information associated with the preexisting written work in the database.

9. The computer-implemented method of claim 8, wherein the additional information includes a visual rendition representing the preexisting written work.

10. The computer-implemented method of claim 7, wherein the audio file is further indexed in the computer memory based on additional information associated with the preexisting written work in the database.

11. The computer-implemented method of claim 3, wherein the computer-memory stores a plurality of recorded audio files that are indexed by corresponding bibliographic information.

12. The computer-implemented method of claim 11, wherein the plurality of audio files are further indexed by identities of users that recorded them.

13. The computer-implemented method of claim 3, further comprising incorporating, by the voice-activated product into the audio file, one or more sound effects selected by the user.

14. The computer-implemented method of claim 3, further comprising initiating, by the voice-activated product, an interactive dialog tailored towards the child.

15. A voice-enabled device comprising:

one or more processors;

one or more speakers operably coupled with the one or more processors;

one or more microphones operably coupled with the one or more processors; and memory operably coupled with the one or more processors, wherein the memory stores instructions that, in response to execution of the instructions by the one or more processors, cause the one or more processors to:

receive, at one or more of the microphones, a first command from a user, wherein the first command indicates that the user wishes to record an audible rendition of a narrative, wherein the narrative comprises a preexisting written work;

receive, at one or more of the microphones devices, bibliographic input from the user, wherein the bibliographic input is indicative of bibliographic information associated with the narrative;

record, via one or more of the microphones, the audible rendition of the narrative spoken by the user;

match the bibliographic information to the preexisting written work in a database, wherein additional information is associated with the preexisting written work in the database;

store, in the memory or in computer memory of one or more remote computing devices, an audio file comprising the recorded audible rendition of the narrative spoken by the user, wherein the audio file is indexed based at least in part on the bibliographic information;

receive, at one or more of the microphones, a voice input from a subsequent user;

detect one or more characteristics of the voice input;

determine, based on the detected one or more characteristics, that the subsequent user is a child;

in response to the determination that the subsequent user is a child, bias speech recognition in respect of the voice input towards recognition of the additional information associated with the preexisting written work in the database;

recognize in the voice input, based on the biased speech recognition, the additional information;

search the computer memory based on the recognized additional information to locate the stored audio file; and render, via one or more of the speakers, the audio file.

* * * * *